(12) United States Patent
Stieger et al.

(10) Patent No.: US 7,735,601 B1
(45) Date of Patent: Jun. 15, 2010

(54) ENGINE NOISE

(75) Inventors: Rory D. Stieger, Derby (GB); Kevin M. Britchford, Loughborough (GB); Paul J. R. Strange, Duffield (GB)

(73) Assignee: Rolls-Royce PLC, London (GB)

( * ) Notice: Subject to any disclaimer, the term of this patent is extended or adjusted under 35 U.S.C. 154(b) by 390 days.

(21) Appl. No.: 11/366,747

(22) Filed: Mar. 3, 2006

(30) Foreign Application Priority Data

Mar. 15, 2005 (GB) .................... 0505246.9

(51) Int. Cl.
*F02K 1/00* (2006.01)
(52) U.S. Cl. .................. 181/213; 181/220; 181/214; 181/215; 181/219; 244/1 N; 244/53 B; 244/62; 415/119
(58) Field of Classification Search ................ 181/220, 181/213, 214, 215, 219; 244/1 N, 53 B, 62; 415/119
See application file for complete search history.

(56) References Cited

U.S. PATENT DOCUMENTS

| | | | |
|---|---|---|---|
| 2,944,623 A * | 7/1960 | Bodine, Jr. ................. 181/213 |
| 3,065,818 A * | 11/1962 | Lombard et al. ............ 181/213 |
| 3,174,282 A * | 3/1965 | Harrison ................ 239/265.17 |
| 3,592,291 A | 7/1971 | Medawar et al. |
| 3,611,724 A | 10/1971 | Kutney |
| 3,776,363 A * | 12/1973 | Kuethe ..................... 181/213 |
| 3,780,827 A | 12/1973 | Straight |
| 3,814,901 A | 6/1974 | Morhack ................... 219/401 |
| 3,861,140 A * | 1/1975 | Krabacher .................. 60/262 |
| 3,905,445 A * | 9/1975 | Scharton .................. 181/213 |
| 3,919,627 A | 11/1975 | Allen ........................ 324/30 |
| 3,934,675 A * | 1/1976 | Lear ......................... 181/220 |
| 4,117,671 A | 10/1978 | Neal et al. |
| 4,135,363 A * | 1/1979 | Packman .................... 60/262 |
| 4,372,110 A * | 2/1983 | Fletcher et al. .............. 60/262 |
| 4,496,906 A | 1/1985 | Clack ....................... 324/439 |
| 4,754,924 A * | 7/1988 | Shannon ................. 239/127.3 |
| 4,786,016 A * | 11/1988 | Presz et al. ................. 244/130 |
| 4,806,912 A | 2/1989 | Clack ....................... 340/603 |
| 5,154,052 A | 10/1992 | Giffin, III et al. |
| 5,178,125 A | 1/1993 | Kuen ........................ 126/20.2 |
| 5,353,598 A * | 10/1994 | Huck et al. .................. 60/725 |
| 6,078,178 A | 6/2000 | Barnett ..................... 324/439 |
| 6,082,635 A * | 7/2000 | Seiner et al. ........... 239/265.19 |
| 6,094,907 A * | 8/2000 | Blackner ................... 60/226.1 |
| 6,285,110 B1 * | 9/2001 | Tong et al. .................. 310/270 |
| 6,487,848 B2 | 12/2002 | Zysman et al. |
| 6,505,706 B2 * | 1/2003 | Tse ........................... 181/213 |
| 6,606,854 B1 * | 8/2003 | Siefker et al. ................ 60/262 |
| 6,658,839 B2 * | 12/2003 | Hebert ........................ 60/204 |

(Continued)

FOREIGN PATENT DOCUMENTS

EP 0 999 358 A 5/2000

(Continued)

*Primary Examiner*—Jeffrey Donels
*Assistant Examiner*—Forrest M Phillips
(74) *Attorney, Agent, or Firm*—Oliff & Berridge, PLC

(57) ABSTRACT

In order to provide noise suppression, bumps or undulations are provided on a nozzle surface in order to vary the convergent-divergent ratio between that surface and an opposed nozzle surface. By such an approach, a circumferential variation in the shock cell pattern is created and the flow is deflected so as to enhance turbulent mixing thereby suppressing noise.

38 Claims, 15 Drawing Sheets

U.S. PATENT DOCUMENTS

| | | | |
|---|---|---|---|
| 6,666,016 B2 * | 12/2003 | Papamoschou | 60/226.1 |
| 6,718,752 B2 * | 4/2004 | Nesbitt et al. | 60/204 |
| 6,786,038 B2 * | 9/2004 | Lair | 60/226.1 |
| 6,813,877 B2 | 11/2004 | Birch et al. | |
| 6,826,901 B2 * | 12/2004 | Hebert | 60/204 |
| 6,854,260 B2 * | 2/2005 | Anderson | 60/204 |
| 6,896,100 B2 * | 5/2005 | Yamamoto | 181/215 |
| 6,935,098 B2 * | 8/2005 | Bardagi et al. | 60/262 |
| 7,043,898 B2 * | 5/2006 | Rago | 60/262 |
| 7,065,957 B2 * | 6/2006 | Balzer | 60/204 |
| 7,246,481 B2 * | 7/2007 | Gutmark et al. | 60/204 |
| 7,389,635 B2 * | 6/2008 | Anderson et al. | 60/204 |
| 7,392,651 B2 * | 7/2008 | Goutines et al. | 60/262 |
| 2002/0189896 A1 * | 12/2002 | Tse | 181/213 |
| 2004/0237534 A1 | 12/2004 | Webster et al. | |
| 2005/0138915 A1 * | 6/2005 | Bardagi et al. | 60/262 |
| 2005/0210860 A1 * | 9/2005 | Gutmark et al. | 60/204 |
| 2007/0033922 A1 * | 2/2007 | Reba et al. | 60/262 |
| 2007/0235080 A1 * | 10/2007 | Hocking | 137/85 |

FOREIGN PATENT DOCUMENTS

| | | |
|---|---|---|
| EP | 1 482 159 A | 12/2004 |
| GB | 1 045 295 A | 10/1966 |
| GB | 1 193 372 A | 5/1970 |
| GB | 2 012 881 A | 8/1979 |
| GB | 2 132 269 A | 7/1984 |
| GB | 2 289 921 A | 12/1995 |

* cited by examiner

Fig.8.
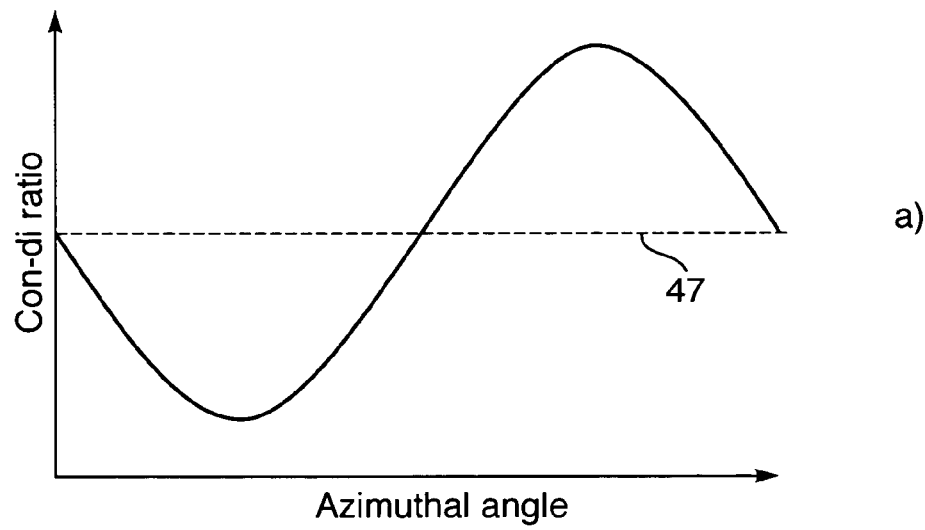
a)
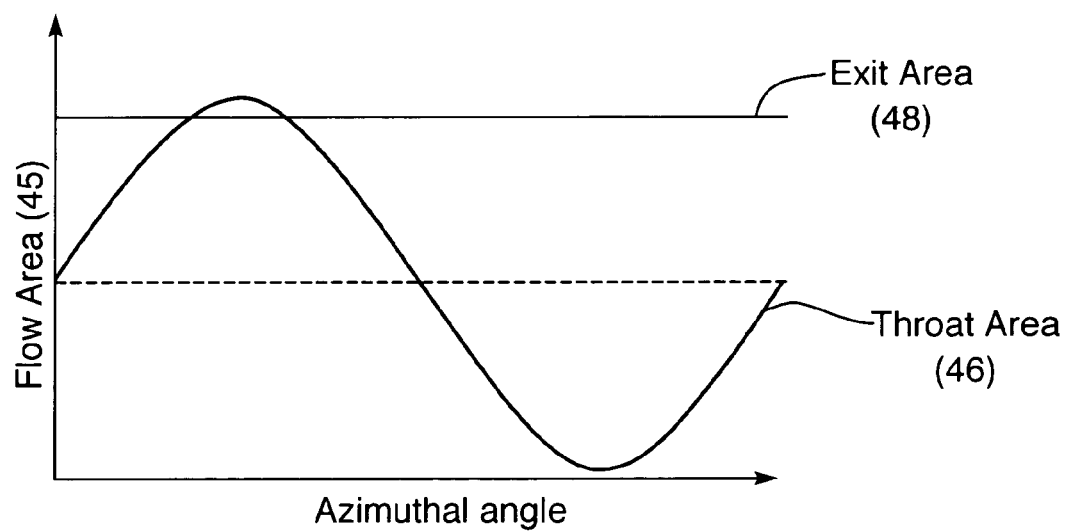

ENGINE NOISE

The present invention relates to gas turbine engine noise and more particularly to jet noise under cruise conditions.

The general stages of gas turbine operation are known. In particular, it will be understood that there is a downstream jet created as the various gas streams are forced out of the engine in order to create propulsion. Inherently such jet flows create noise as the jet shear layer breaks down. This shear layer breakdown along with other factors such as the presence of shock waves produces noise.

Clearly, noise is a detrimental factor with respect to gas turbine engine operation. Thus, there is a continuing objective to reduce engine noise in all phases of engine operation including whilst an engine is propelling an aircraft through the air at altitude and under cruise conditions.

At cruise conditions the nozzle of a jet engine is not perfectly expanded. As a result a shock structure occurs in the jet. This shock structure is strongest near the nozzle exit but extends several diameters downstream of the nozzle in a repeat but progressively fading shock cell pattern.

Shock cell noise is generated as the turbulence of the jet shear layer passes through and interacts with the shock structure of the jet (see Harper-Bourne, M. and Fisher, M. J., 1973, "The Noise from Shock Waves in Supersonic Jets", Proceedings (No. 131) of the AGARD Conference on Noise Mechanisms, Brussels, Belgium). If one considers a cross section through half of a typical high bypass ratio civil engine nozzle system, with the bypass jet imperfectly expanded, there is a shock structure set up in the bypass stream. The shear layer between the flight stream and the bypass stream becomes turbulent as it develops and the turbulence that results convects through the shock structure generating noise. The region in which the shock cell noise is generated may be several nozzle diameters downstream of the nozzle exit plane.

Shock cell noise may be reduced by previous serrations at the nozzle exit that enhance the mixing of the shear layer so that the turbulence intensity is lower in regions where the turbulence interacts with the shock structure.

Noise suppression by serrations has been demonstrated but this has typically been for environmental noise at take off or landing conditions.

Generally, serrated nozzles consist of flaps or tabs added to or cut out of a nozzle so as to generate circumferential flow non-uniformities. The circumferential flow non-uniformities enhance mixing of the jet thereby breaking up coherent structures leading to lower noise.

In order for serrations to reduce the noise of a nozzle they need to disturb the nozzle flow. This typically requires the serrations to deflect the flow by having some incidence or insertion to the flow. This results in increased drag and an associated loss of performance. The performance loss and noise reduction mechanism are inherently linked for serrations.

The increased surface area of serrations also increases the drag. Increased surface area also increases overall weight.

In accordance with the present invention there is provided a nozzle for a gas turbine engine, the nozzle comprising a nozzle surface including a plurality of undulations to vary available cross sectional area across the nozzle between the nozzle surface and an opposed surface of the nozzle over a desired convergent-divergent ratio range for noise control of a jet passing through the nozzle in use.

Additionally, the undulations also provide variation in the angle of flow of the jet passing through the nozzle.

Generally, the variation in cross sectional area is adjusted to provide stimulation in mixing of a shear layer of the jet for relative noise reduction in comparison with that without mixing of the shear layer of the jet. Additionally, the undulations alter the repeat cycle and/or provide variation of intensity of shock cells generated by the jet.

Generally, the undulations comprise bumps formed in the nozzle surface.

Possibly, the undulations are sinusoidal in a circumferential direction or in a plane perpendicular to a jet flow direction in use.

Preferably, the undulations each comprise maximum amplitude, the maximum amplitude situated a distance between 2% and 15% of the nozzle diameter along the nozzle surface upstream from the nozzle exit plane.

Preferably, the maximum amplitude situated a distance equivalent to 6% of the nozzle diameter upstream of nozzle exit plane.

Alternatively, the undulations each comprise a maximum amplitude, the maximum amplitude situated within a distance equivalent to +/−2% of the nozzle diameter along the nozzle surface from the nozzle throat plane.

Preferably, the approximate cross-section shape of the undulations are from the group comprising triangular, trapezoidal, part-circular, sinusoidal and asymmetric-sinusoidal.

Alternatively, the undulations have an aerodynamically smooth gradual spline in an axial direction of jet flow in use. Typically, the aerodynamically smooth spline is between radii at three fixed axial locations along the nozzle surface from the nozzle exit plane, one radii within a distance upstream equivalent to 20% of the nozzle diameter, one radii at a point of maximum undulation amplitude within an upstream distance equivalent to 15% of the nozzle diameter and one radii within 10% of the nozzle exit plane diameter.

Generally, the convergent-divergent ratio is in the range of 1 to 1.01 preferably 1.008.

Typically, the undulations have amplitude 39 in the range 0.1-2.0% of the nozzle exit diameter.

Typically, the nozzle comprises a bypass nozzle of a gas turbine engine with the undulations on an inner surface of the outer wall and/or outer surface of an inner wall of the bypass nozzle.

Possibly, the nozzle is a core nozzle of a gas turbine engine with undulations on an inner surface of the outer wall and/or outer surface of the inner wall of the cone nozzle.

Possibly, the undulations are symmetrically regularly circumferentially distributed about the nozzle surface. Alternatively, the undulations are asymmetrically and/or irregularly circumferentially distributed about the nozzle surface. Further, the undulations may be at different axial positions relative to an exit plane of the nozzle. Possibly, the undulations have groups of differing amplitudes circumferentially and/or axially in the nozzle surface. Additionally, the undulations may have different groups of axial length and/or width relative to each other.

Possibly, the nozzle surface has an edge with serrations or tabs. Additionally, the undulations may be arranged reciprocally with the serrations for additional variation in convergent-divergent ratio range.

Alternatively, the tabs are deployable for noise reduction. Possibly, alternate tabs are deployable for noise reduction and the undulations are formed on any one or more of the tabs. Preferably, the undulations are transformable between a deployed position and a non-deployed position, the non-deployed position being less aerodynamically obtrusive than the deployed position. Further, the undulations may be transformable to a second deployed position, between the deployed and non-deployed positions.

Possibly, the undulations comprise a shape memory material element. Alternatively, the shape memory material element comprises two layers of SMM material, each layer having different switch temperatures and capable of deploying in a first shape and a second shape, the second shape having a greater amplitude that the first shape. Alternatively, the shape memory material element comprises two layers, one layer of SMM material and the other layer of resilient material to provide a spring force to the element.

Preferably, the undulations are integral with the nozzle. Alternatively, the undulations are created by attached elements individually or as part of an assembly secured to the nozzle surface.

Alternatively, the undulations are variable in terms of amplitude and/or position and/or distribution in the nozzle surface.

Alternatively, such variation is by use of inflatable features with the nozzle surface or deployable mechanical portions of the nozzle surface.

Preferably, the number of undulations is in the range one to forty-two and preferably twenty undulations distributed about the nozzle surface.

Embodiments of the present invention will now be described by way of example and with reference to the accompanying drawings in which;

FIG. 5b is a section A-A through the nozzle shown in FIG. 5 showing alternative embodiments to FIG. 5a;

Figure 10:
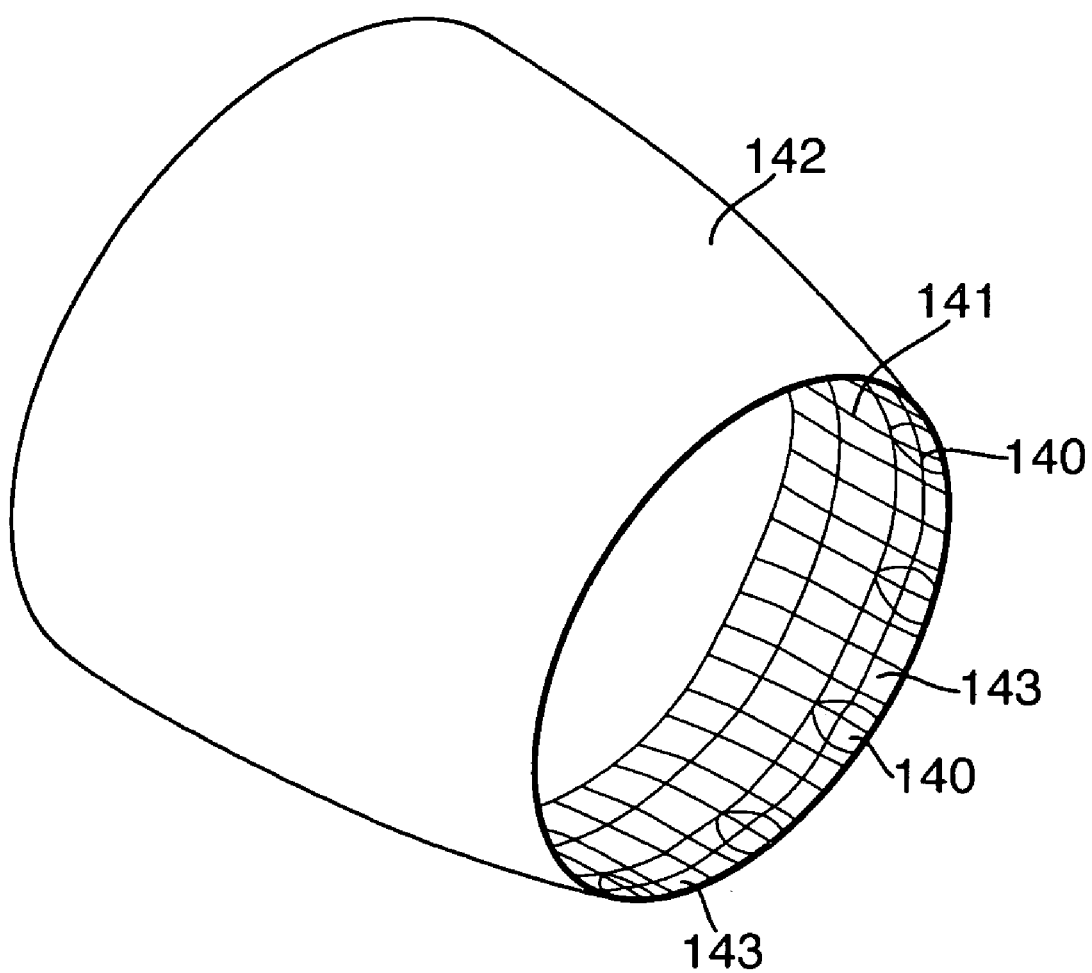
Figure 11:
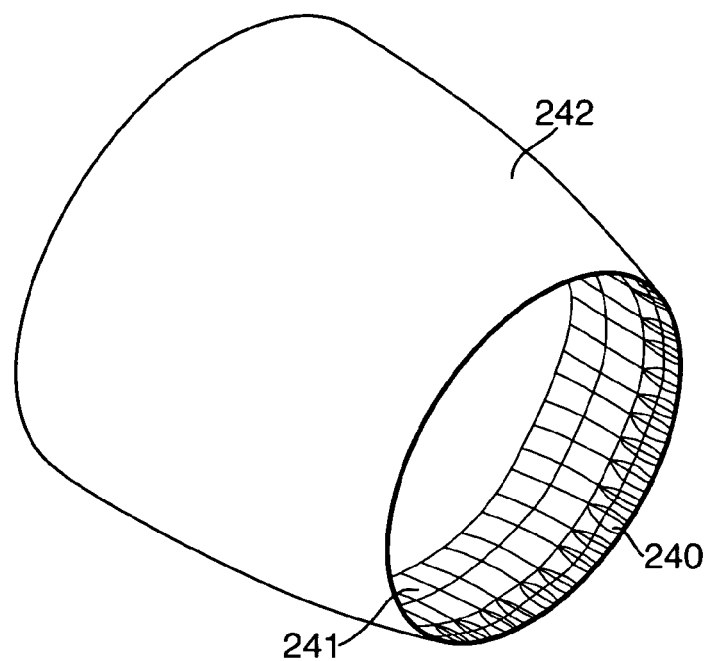
Figure 12:
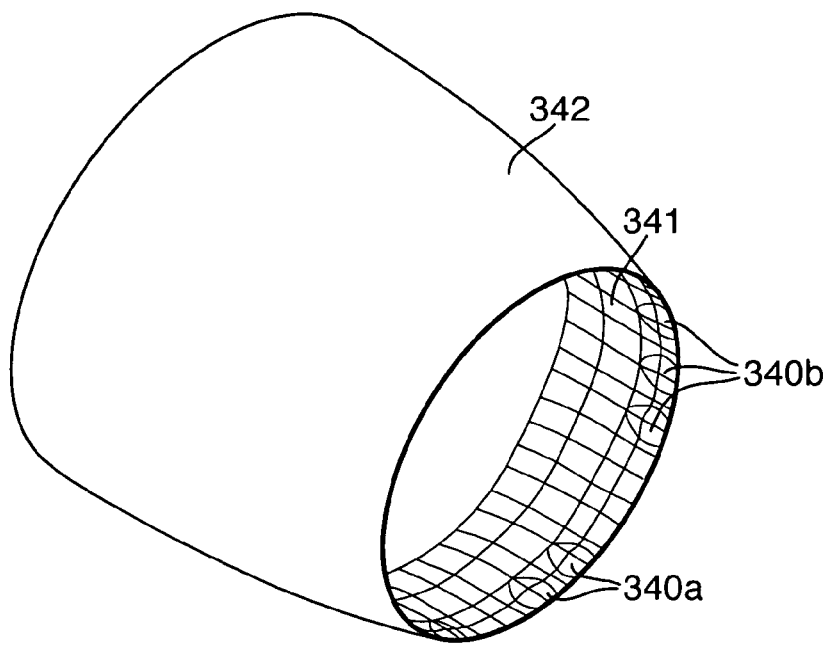
Figure 13:
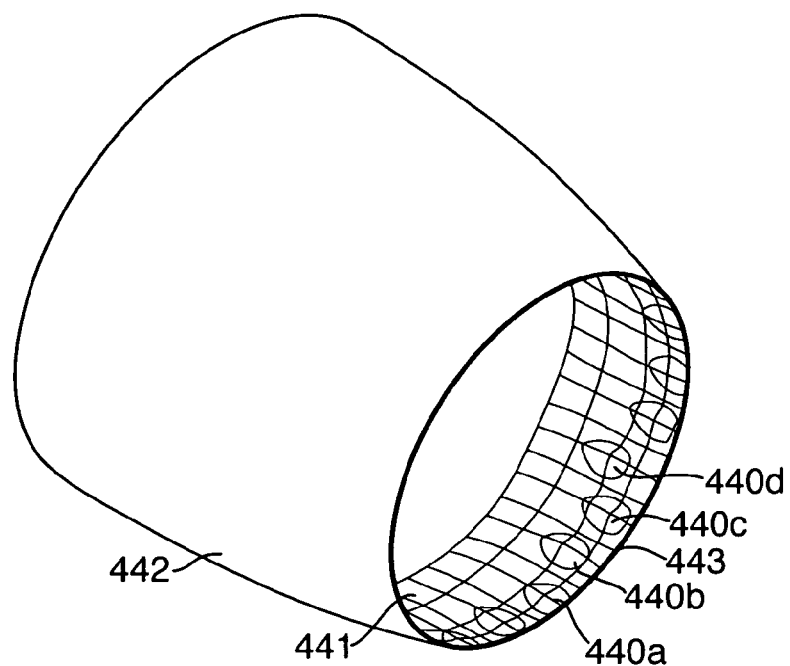
Figure 14:
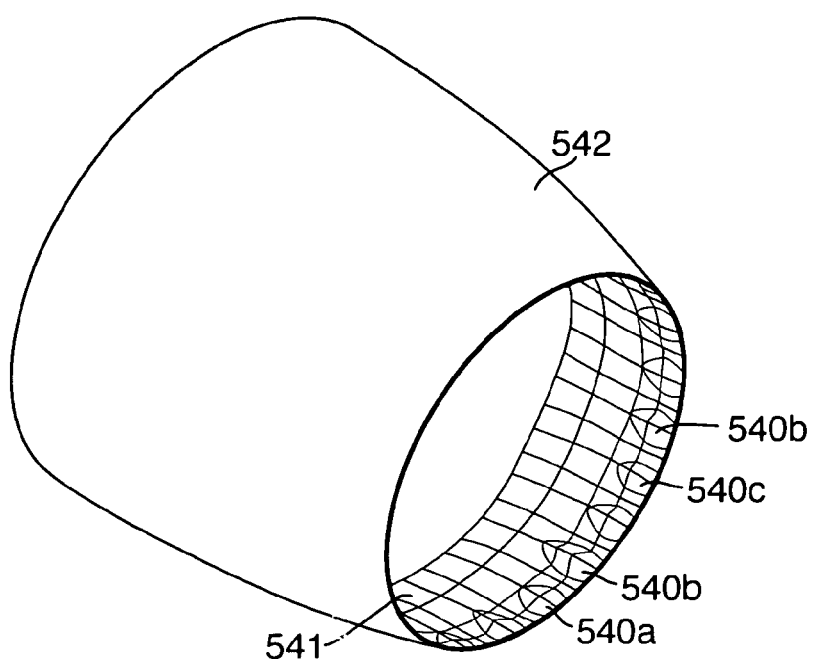
Figure 13A:
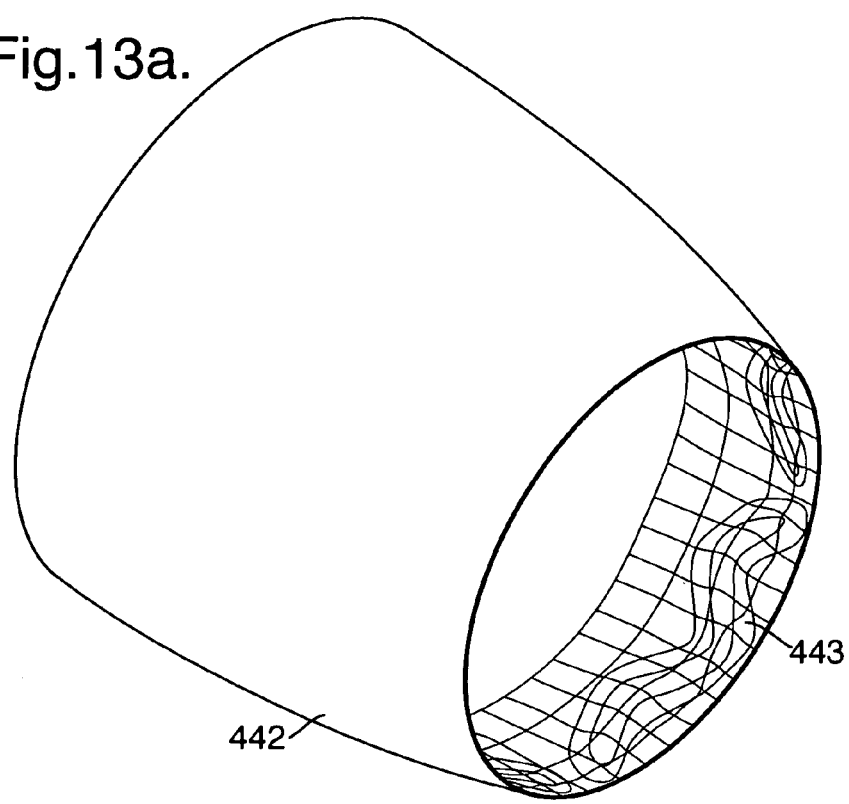
Figure 15:
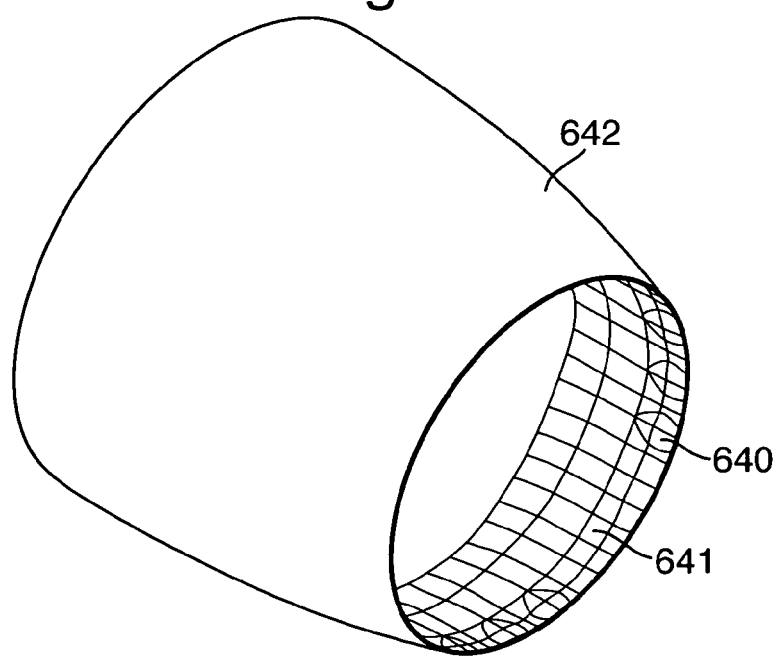
Figure 16:
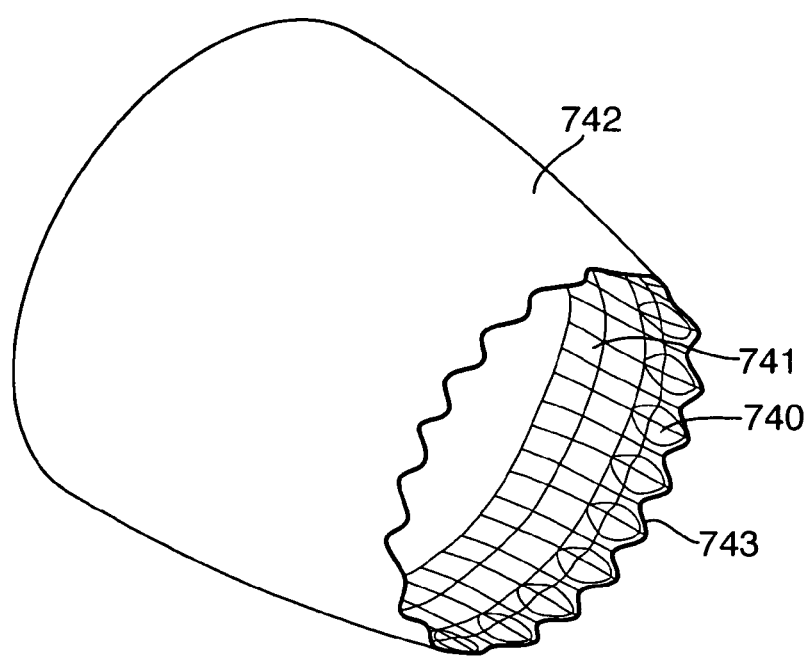
Figure 17:
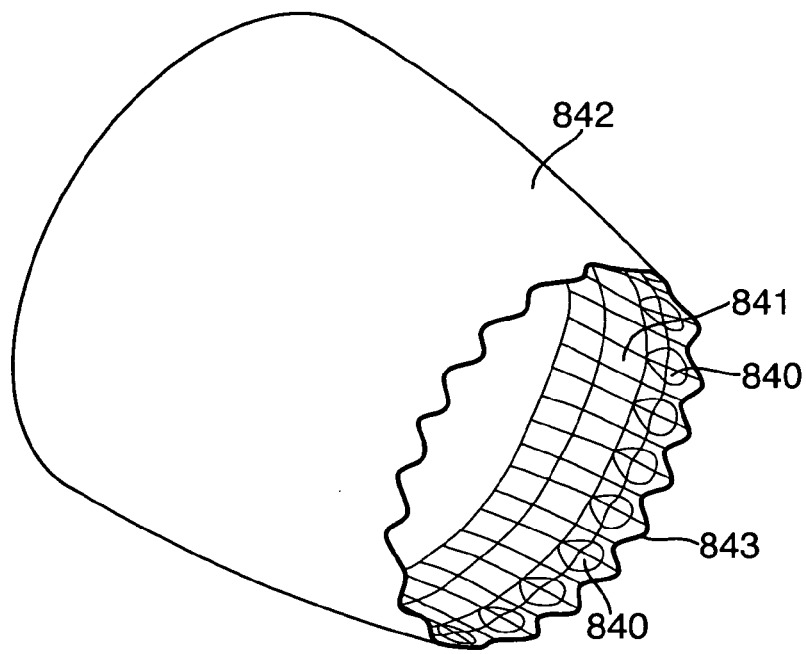
Figure 18:
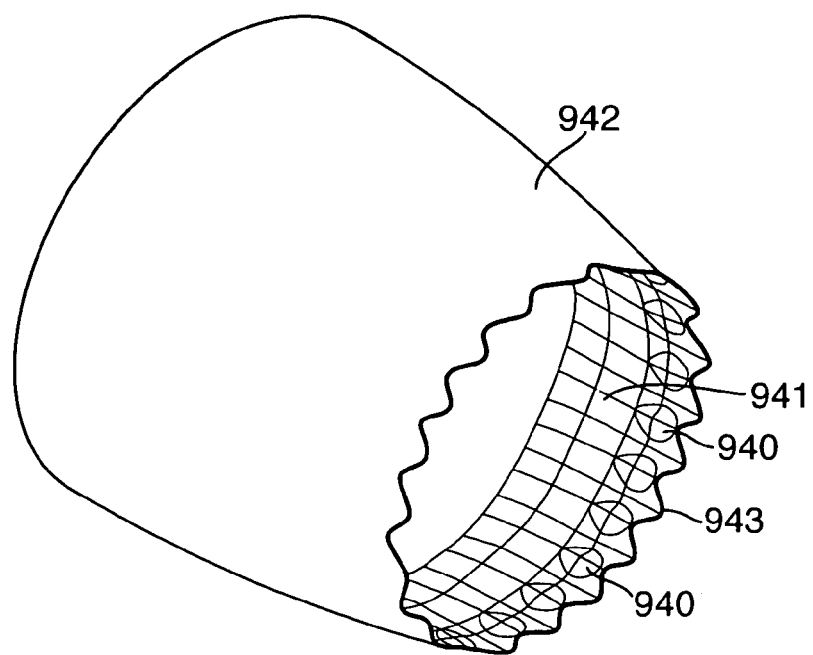
Figure 19:
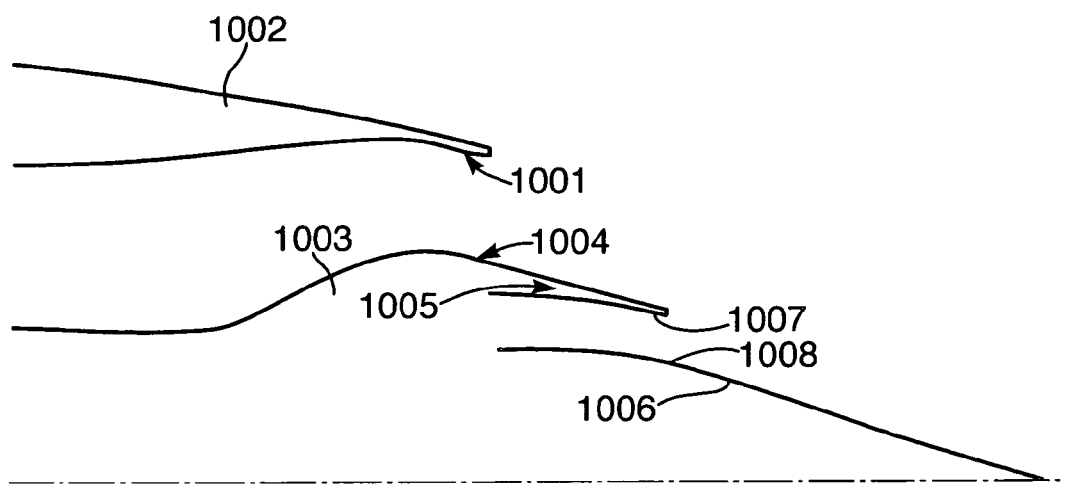

FIG. 8 provides graphical illustrations with respect to variation in convergent-divergent ratio and available flow area against azimuthal angle (circumferential direction) for an undulation in accordance with the present invention;

FIG. 9 provides a graphic illustration of variation in overall SPL against jet Mach number;

FIG. 10 provides a schematic illustration of a first alternative undulation distribution in accordance with the present invention;

FIG. 11 provides a schematic perspective view of a second alternative undulation distribution in accordance with the present invention;

FIG. 12 provides a schematic perspective view of a third alternative undulation distribution in accordance with the present invention;

FIG. 13 provides a schematic perspective view of a fourth alternative embodiment of an undulation distribution in accordance with the present invention;

FIGS. 13a and b provide schematic perspective view of alternative embodiments of the fourth embodiment shown in FIG. 13 and in accordance with the present invention;

FIG. 14 provides a schematic perspective view of a fifth alternative undulation distribution in accordance with the present invention;

FIG. 15 provides a schematic perspective view of a sixth alternative embodiment of an undulation distribution in accordance with the present invention;

FIG. 16 provides a schematic perspective view of a seventh alternative embodiment of an undulation distribution in accordance with the present invention;

FIG. 17 provides a schematic perspective view of an eighth alternative embodiment of an undulation distribution in accordance with the present invention;

FIG. 18 provides a schematic perspective view of a ninth alternative embodiment of an undulation distribution in accordance with the present invention; and FIG. 19 provides a schematic part cross-section illustrating location of undulations in accordance with the present invention.

Figure 20:
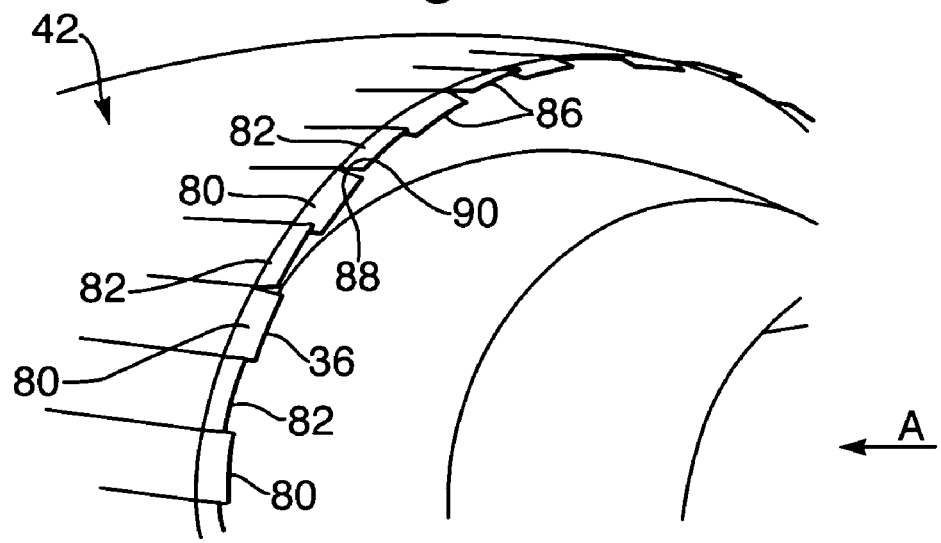

FIG. 20 provides a schematic perspective view of a tenth alternative embodiment of an undulation distribution combined with a nozzle having deployable tabs in accordance with the present invention.

Figure 21:
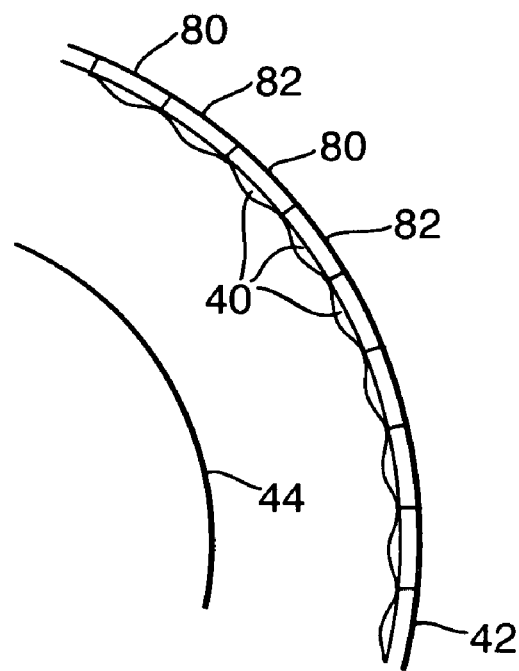

FIG. 21 is a view in the direction of arrow A on FIG. 20.

Figure 5:
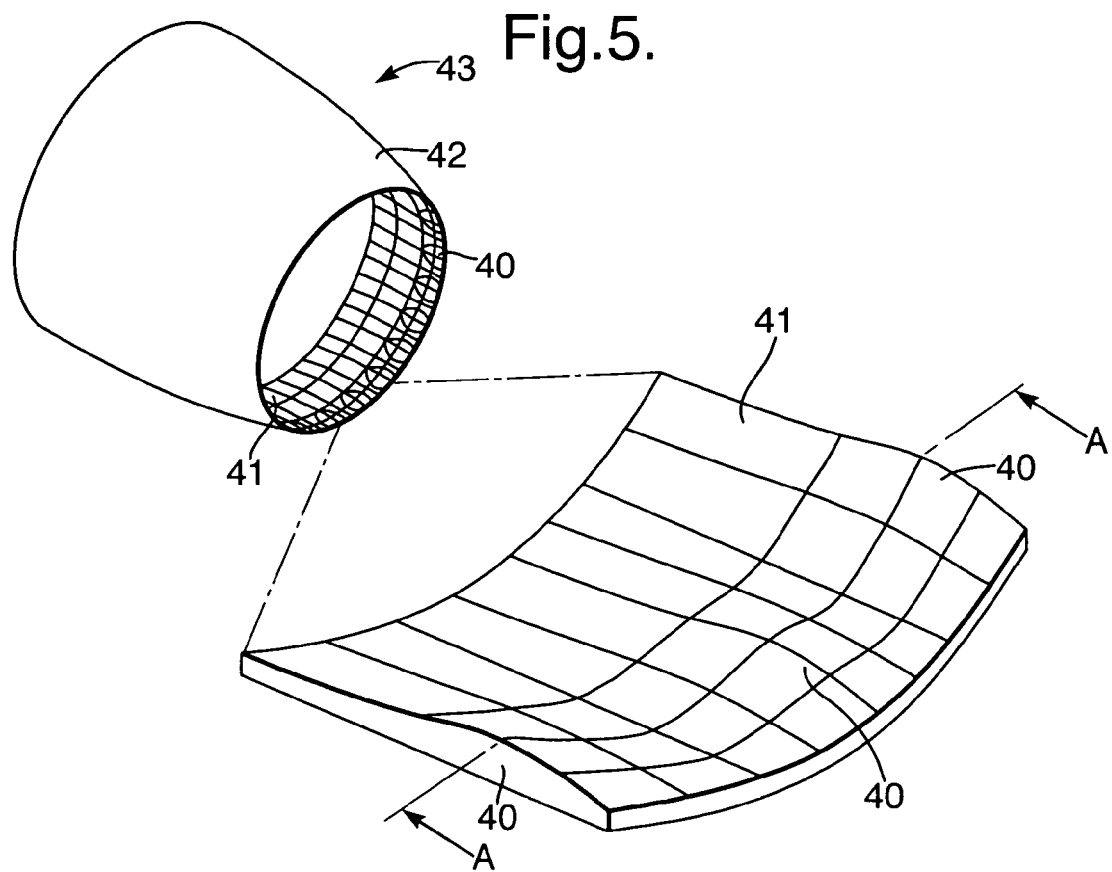
FIG. 5 is a schematic enlarged view of a portion of a nozzle surface in accordance with the present invention.
Figure 22:
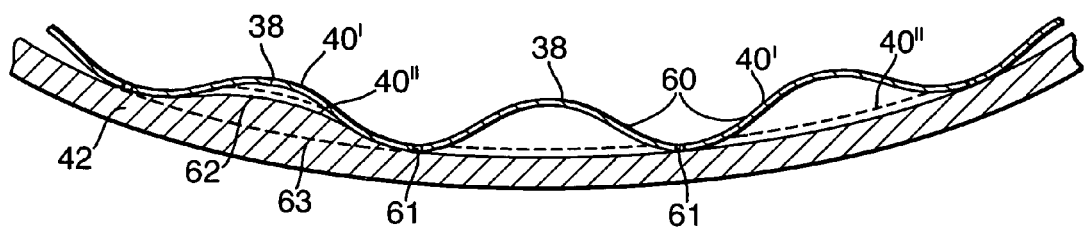
Figure 22A:
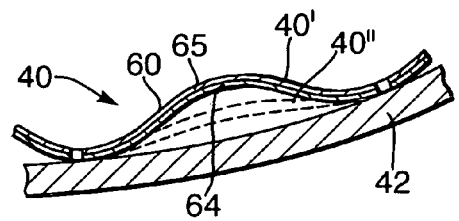

FIGS. 22 and 22A is a part section A-A through an alternative embodiment than the nozzle shown in FIG. 5.

Figure 1:
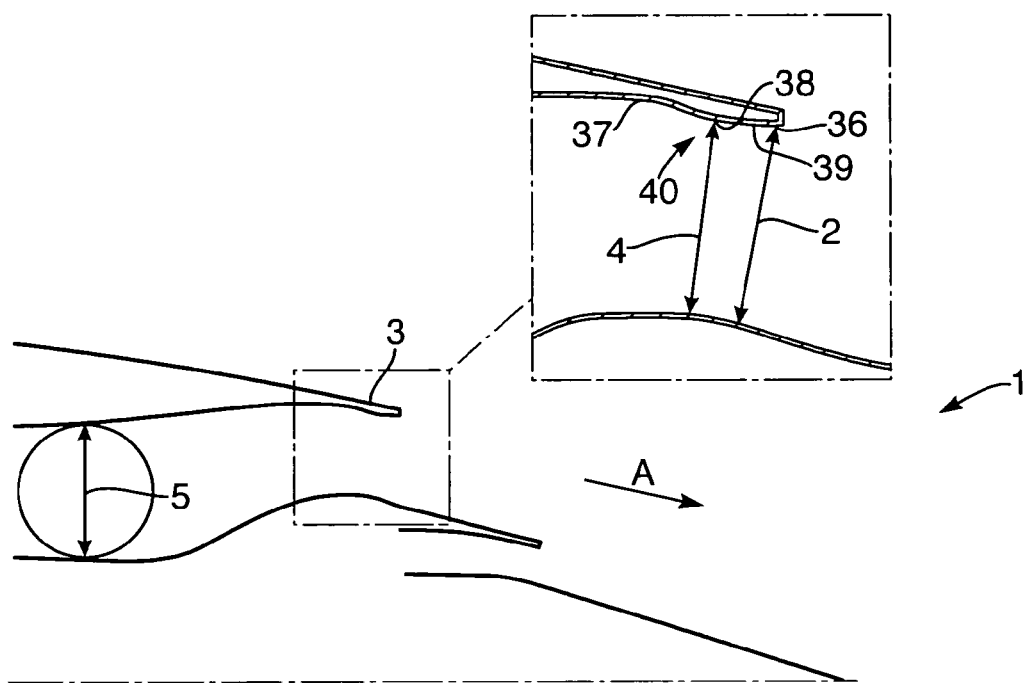
FIG. 1 is a schematic half cross-section of a typical turbine engine nozzle.

FIG. 1 shows a half cross section through a typical high bypass ratio civil aero turbine engine exhaust nozzle 1. The bypass stream, that is to say the outer stream that passes only through the fan has a nozzle exit area 2. The area 2 is thus available for flow to pass through and exit a nozzle 3. In the nozzle 3 there is a nozzle throat area 4 which is the minimum area for the flow to pass through at any point in the bypass nozzle 1. This limits the possible mass flow rate so that there may be choking of the flow with expansion after the throat area 4.

The throat area 4 and exit area 2 may be of different magnitudes and may occur at axially separated positions. A convergent nozzle is one in which a flow area 5 is continually decreasing in a direction of flow A (or axial direction) and therefore one in which the exit area 2 is the minimum area and thus also the throat area 4. A convergent-divergent nozzle (FIG. 1) is one in which the throat area 4 is upstream of the exit area 2 so that the flow area 2 decreases in the direction A of flow until it reaches a minimum point at the throat area 4 and then increases to the exit area 2.

Figure 3:
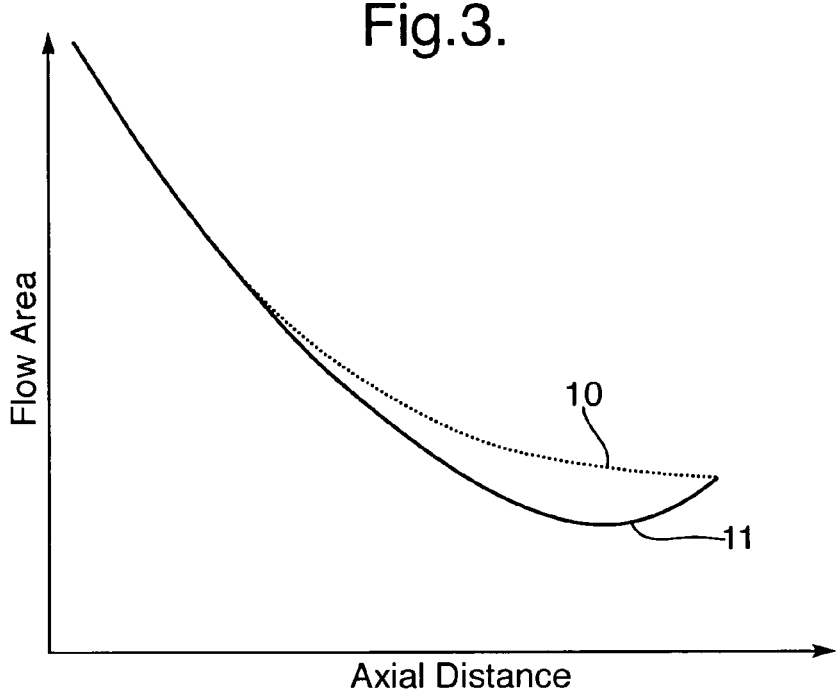
FIG. 3 is a graphic core representation illustrating available flow cross-sectional area against axial distance for a convergent nozzle and a convergent-divergent nozzle as illustrated in FIG. 1.

The respective variations in the available flow area is depicted graphically against axial distance in the flow direction A in FIG. 3. Thus, as can be seen, with a convergent nozzle the relationship is given by line 10, whilst with a convergent-divergent nozzle the relationship is given by line 11. The convergent-divergent ratio of a nozzle is therefore given by the ratio of the exit area 2 in comparison with the throat area 4 (FIG. 1). The convergent nozzle has a convergent-divergent ratio of unity (1) whilst, in general, a convergent-divergent nozzle has a convergent-divergent ratio greater than 1. With a typical engine used for aircraft, the nozzle configurations have a convergent-divergent ratio in the range 1.00 to 1.02 and for the Applicant's commercial production engines typically a range between 1.00 and 1.01.

Figure 2:
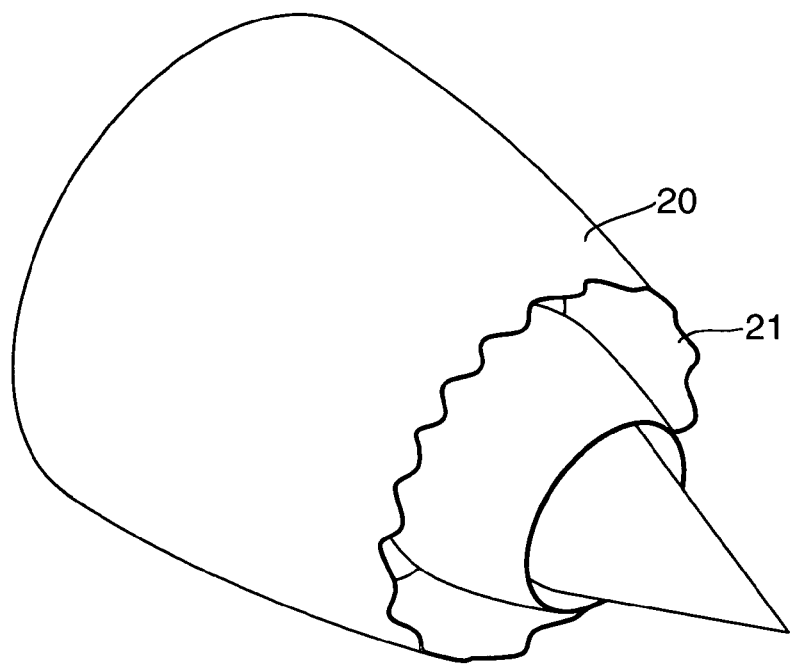
FIG. 2 is a schematic perspective view of a prior art turbine engine nozzle incorporating serrations.

FIG. 2 is included to provide an illustration of a typical prior serrated nozzle in order to provide noise suppression. As can be seen, the nozzle 20 has serrations 21 which can take the form of flaps or tabs added to or cut from the nozzle in order to generate circumferential flow non-uniformities, which as indicated above break up coherent structures in the jet flow in order to give rise to noise suppression. In effect, the serrations 21 deflect the flow so as to enhance turbulent mixing thereby suppressing noise. However, as indicated above, serrations can add significantly to cost, weight and drag upon the engine reducing efficiencies.

The present nozzle provides a circumferentially varying convergent-divergent nozzle by incorporating a number of undulations or bumps into at least one nozzle surface. Typically, twenty sinusoidal and evenly spaced bumps are machined into an inner surface of the outer wall of a bypass nozzle such that the radius varies through the pitch of the sinusoidal bumps. As will be described later, a number of varying alternative embodiments will provide undulations and bumps in differing patterns and distributions in accordance with particular operational requirements. With regard to the first embodiment described, as indicated sinusoidal oscillations in the form of bumps in the circumferential direction about the nozzle will be provided.

Figure 6:
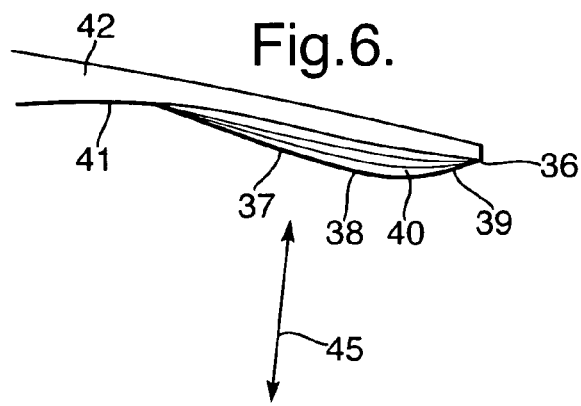
FIG. 6 is a schematic cross-section showing variation in cross-sectional area between a nozzle surface and an opposed surface of a nozzle in accordance with the present invention.

Referring again to FIG. 1 and also seen in FIG. 6, the bumps 40 comprise an upstream surface 37, a point of maximum amplitude 38 and a downstream surface 39. The undulations or bumps 40 will generally have a smooth spline in the axial direction with radii at three fixed axial locations along the nozzle surface. Defining the upstream surface 37 is a first fixed axial radii defined at a position up to 20%, but in a preferred example 10% of the nozzle exit plane diameter 2, upstream of the nozzle throat position 4. A second fixed radius is provided between the upstream and downstream surfaces 37, 39 and defines the maximum bump amplitude 38. The second fixed radius is positioned approximately 6% of the nozzle exit plane diameter upstream of the nozzle exit position, but in other embodiments may be positioned between 2% and 15% of the exit plane diameter upstream of the nozzle exit position. A third fixed radius preferably is positioned at the nozzle exit plane itself, but may be positioned up to 10% of the nozzle exit plane diameter upstream of the exit plane.

Figure 4:
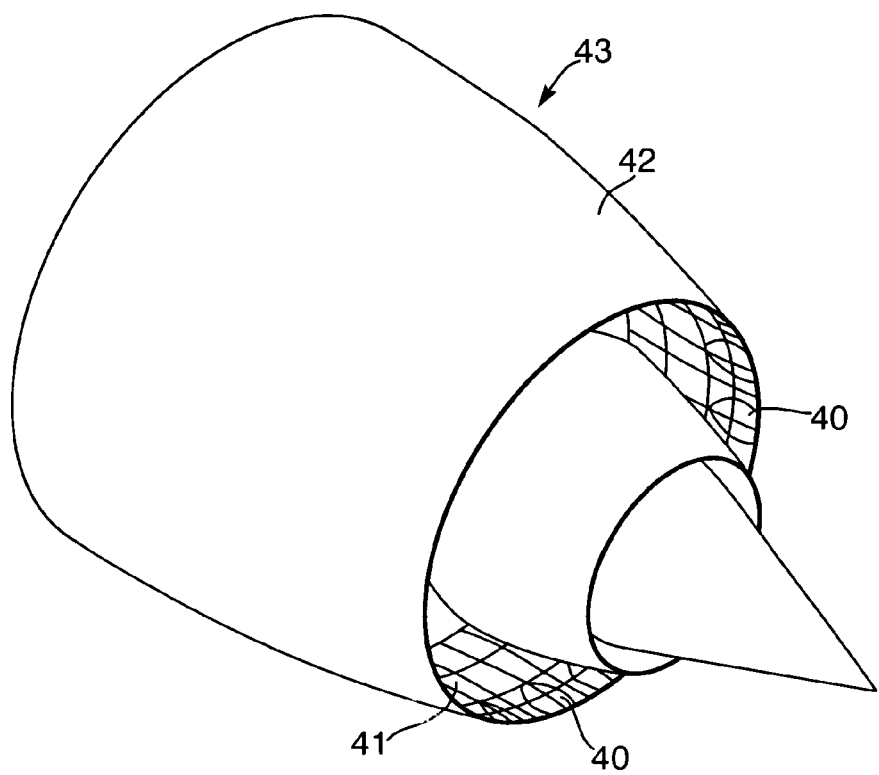
FIG. 4 is a schematic perspective view of a first embodiment of a nozzle incorporating undulations in accordance with the present invention.

As indicated above in a first embodiment of a nozzle undulations or bumps will be provided circumferentially in a regular distribution pattern. FIGS. 4 and 5 illustrate the first embodiment of the invention with FIG. 4 providing a schematic perspective illustration of a nozzle whilst FIG. 5 provides an enlarged view of a section of the nozzle bypass inner wall surface.

Undulations or bumps 40 are regularly circumferentially distributed about an inner surface 41 of an outer wall 42 of a bypass nozzle of an engine 43. Thus, as can be seen in both FIGS. 4 and 5, the effect of the undulations or bumps 40 is to provide a convergent-divergent nozzle form along the axial length of the undulation or bumps 40 with generally areas between the undulations or bumps 40 being flatter and therefore creating a convergent nozzle format. In such circumstances, as described previously, noise suppression is achieved through mixing of the shear layer so that the turbulence intensity is lower in the regions where the turbulence interacts with the shock structure from the nozzle. Furthermore, the shock cell repeat pattern will vary across the undulations again leading to noise suppression.

Figure 5A:
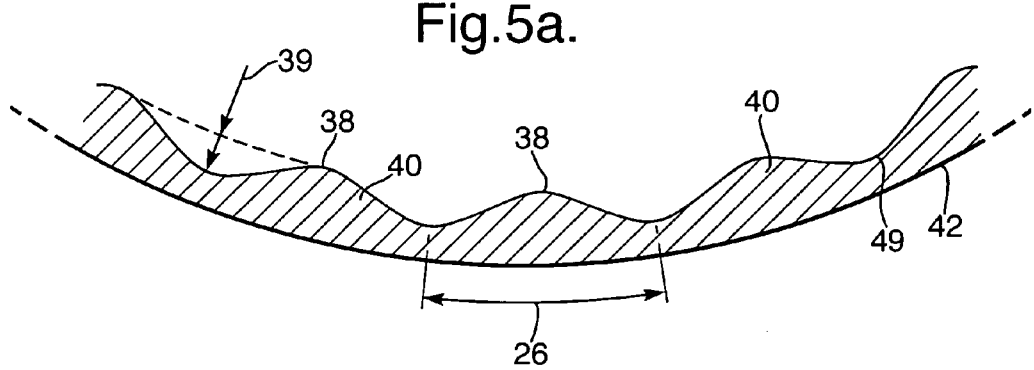
FIG. 5a is a section A-A through the nozzle shown in FIG. 5.

Referring to FIG. 5a, which shows the first embodiment in more detail, generally the undulations 40 are sinusoidal and have amplitude 39 in the range 0.1-3.0% of the nozzle exit diameter, but preferably in the range between 0.3% and 1.5%. Typically, the undulations have maximum amplitude point 38 positioned within ±2% nozzle exit diameter of the nozzle throat position 4. The circumferential extent 26 of the undulations 40 is defined by a length equivalent to between 1° and 45° and the angular spacing 27 between maximum amplitude points 38 is between 2° and 90°, i.e. the total number of bumps is between 180 and 4, however, a preferred number of maximum amplitude points is between 12 and 45.

Figure 5B:
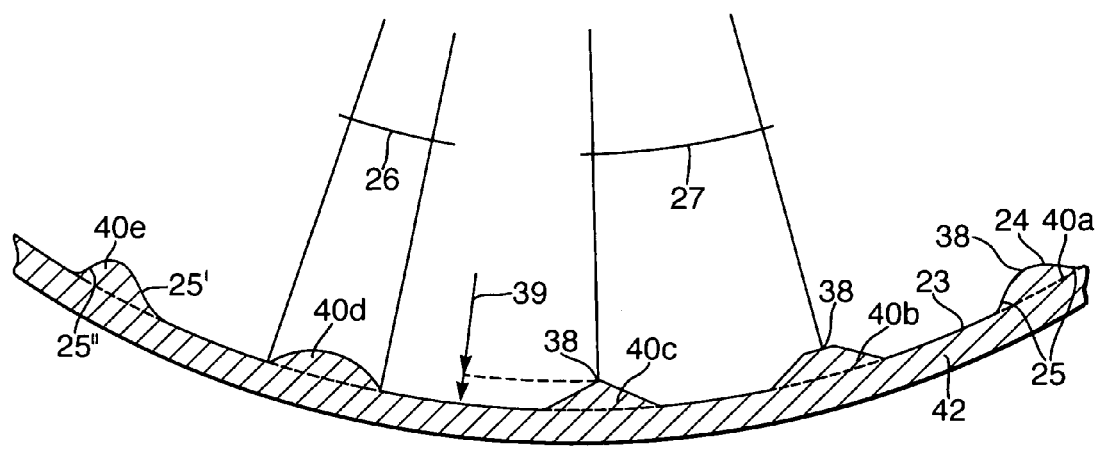

Referring to FIG. 5b, alternate shapes of bumps 40a-e are shown. These alternately shaped bumps 40a-e may be either attached by suitable means to an existing smooth nozzle surface or may be machined into the nozzle wall. Where the bumps are machined into the nozzle wall they may either be proud of the wall surface 23 (as shown) or machined in as for the sinusoidal wave form having peaks 38 and troughs 49 defined by the respective inverse bump shape. Here the undulations 40 are preferably shaped in cross-section as shown by bump 40a, which comprises maximum amplitude 38 defined by a radius 24 and blend radii 25 smoothing the shape into a circumferential profile 23 of the nozzle wall 42. The maximum amplitude 38 is in this case the radial height above the existing or original wall surface 23.

FIG. 5b also shows alternative shapes the undulations or bumps may take without departing from the scope of the invention. Bump 40b is generally trapezoidal in cross-section; bump 40c is triangular; bump 40d is defined by a constant radius (part-circular) and bump 40e is an asymmetric version of bump 40a and similarly defined by three radii but radius 25' is greater than 25".

Each bump 40a-e, in their respective array of bumps, are angularly spaced apart a corresponding distance 27 peak-to-peak (38) dependent on the number required around the nozzle's circumference.

For a rectangular nozzle or other non-circular nozzles the spacing of the bumps peak or maximum amplitude point 38 is the total length of side divided by the number of bumps.

In such circumstances, for a scale model tested by the Applicant, the nozzle exit diameter was 58 millimeters, the first radius is at approximately 11.2 millimeters, the second is at a position 3.6 millimeters upstream of the nozzle exit plane and the final radius at the exit plane itself. In such a situation, the amplitude of the undulations or bumps is in the order of 0.8 millimeters (1.38% of the nozzle exit diameter) with an axial position of maximum amplitude as indicated at 3.6 millimeters upstream of the nozzle exit plane (6% of the nozzle diameter). The scale model comprised 20 bumps 40 (FIG. 5a) evenly spaced at 18° intervals. A 2 db noise reduction was achieved over a similar nozzle without bumps.

In such circumstances, for a production gas turbine engine of the Applicant's, the nozzle diameter is 1450 millimeters, having a bump amplitude in the order of 4.5 millimeters (0.31% of the nozzle exit diameter) with the first radius at approximately 280 millimeters upstream of the nozzle exit plane, the second radius at approximately 90 millimeters upstream of the nozzle exit plane and the third radius at the nozzle exit plane. This nozzle comprised 20 sinusoidal bumps 40a (FIG. 5a) evenly spaced at 18° intervals.

However, for other applications and depending on specific engine operating circumstances different distributions, amplitudes and axial lengths may be used within the ranges indicated throughout this specification and depending on particular noise reduction requirements.

Figure 7:
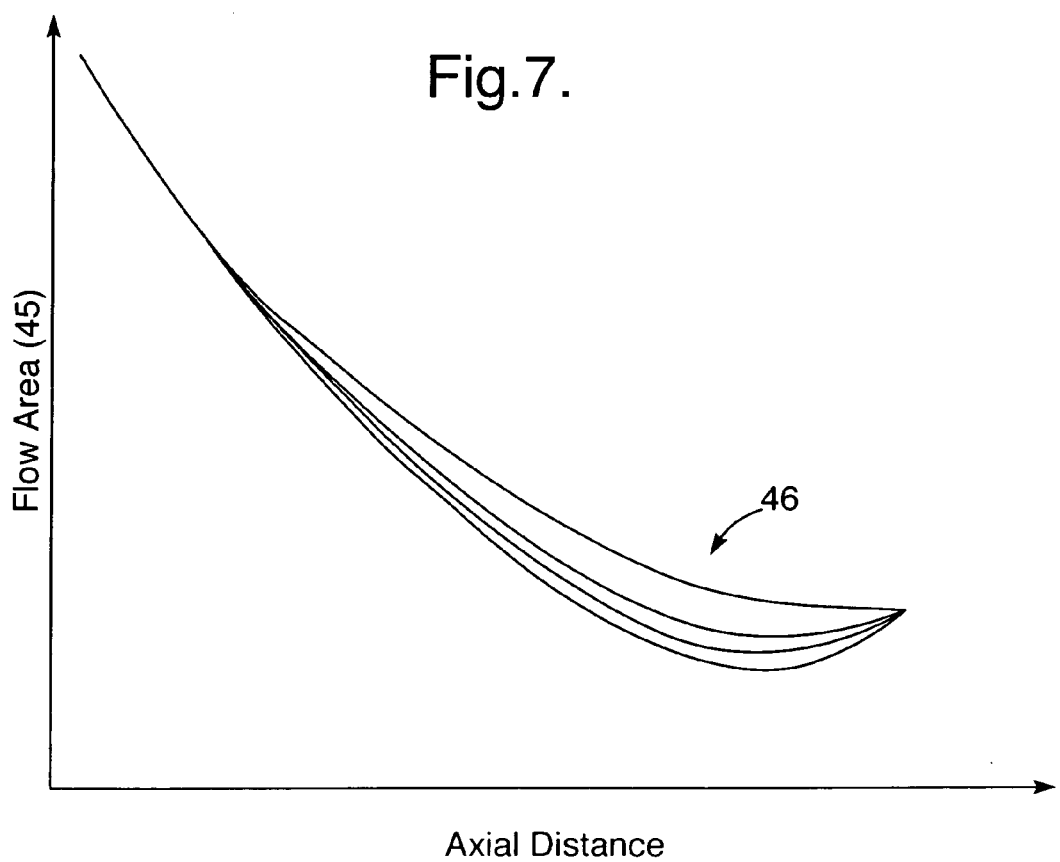
FIG. 7 is a graphic representation of variation in available flow area across a nozzle against axial distance in accordance with the present invention.

FIGS. 6 and 7 illustrate respectively a schematic cross-section through one of the undulations or bumps 40 in the inner nozzle surface 41 of an outer wall of a bypass nozzle 42 with respect to an opposed surface 44 of the nozzle (FIG. 6) and in FIG. 7 a graphic representation illustrating differences in the available nozzle flow area relative to axial distance along the bump 40. Thus, as can be seen, the available flow area 45 between the nozzle surface 41 and the opposed surface 44 is varied in the circumferential direction through the bump and the spaces in the area 41 between the bumps 40. This is illustrated in FIG. 7 through the representative relationship lines 46 showing the variation in available flow area 45 with axial distance in the direction 46 at different circumferential positions across one bump.

The above circumferential variation in available area 45 is further illustrated across, that is to say circumferentially around, the nozzle in FIG. 8 where variations in the convergent-divergent ratio as well as the available flow area 45 are shown relative to the azimuthal angle across the undulation or bump 40. As can be seen, with a sinusoidal undulation or bump 40, a similar sinusoidal relationship is provided in the graphic representations depicted in FIG. 8. In FIG. 8a, the convergent-divergent ratio is depicted against circumferential angle across an undulation or bump without a flat space section between undulations such that there is a continuous sinusoidal variation from one bump to the next such that the convergent-divergent ratio oscillates sinusoidally around an average value 47, but it will be understood where there is an undulation of bump formed with relatively flat spaces either side then a half sinusoidal relationship will be provided in terms of the variation in convergent-divergent in ratio as the bump or undulation amplitude moves into and out of the nozzle across the circumferential width of the bump or undulation. Similarly, the available flow area 46 will vary sinusoidally across the circumferential width of the bump or undulation and relative to a maximum exit area 48 defined at the exit plane of the nozzle.

Referring to FIG. 9, overall shock cell noise 50 is dependent on Mach number 51 of jet. A fully expanded nozzle has minimum noise (52) with over expanded and under expanded nozzles having greater noise (Tam, C. K. W. and Tanna, H. K., Journal of Sound and Vibration, 1982, 81(3), 337-358) shown in FIG. 9.

For a given pressure ratio there exists a convergent-divergent ratio to give a fully (perfectly) expanded jet and this will have the minimum noise as there will be no shock structure established. A fully expanded nozzle does not necessarily meet all operational requirements and so it is impractical for a fixed geometry nozzle to achieve a fully expanded jet at cruise conditions. For information solid line 53 shows the effect of a convergent-divergent nozzle whilst broken line 54 shows a simple convergent nozzle.

If some sectors of a nozzle operate at perfectly expanded conditions then no shock structure will be formed in those sectors and the mechanism for shock cell noise generation will disappear locally. The closer a sector of the nozzle is to being perfectly expanded the weaker the shock structure and the less shock cell noise will be generated. The undulations provide a range of available flow areas to increase the likelihood of a perfect or near perfect expansion for noise suppression.

For an imperfectly expanded supersonic jet from a nozzle of fixed geometry, the angle of the flow relative to the axis of the jet in the region just behind the nozzle exit is a function of the nozzle pressure ratio. This is a result of the flow emerging from the nozzle expanding to match the conditions outside of the nozzle. Moreover, the mass flow of the jet is fixed by the area of the nozzle throat. The final flow area of the jet (outside of the nozzle) is dependent on the mass flow and the freestream conditions. The freestream conditions are very nearly circumferentially uniform and so the flow area of the jet is proportional to the throat area these being linked by the mass flow. A circumferential variation in the throat area thus leads to a circumferential variation in the final flow area of the jet. This mimics the effects of serrations and produces a circumferentially non-uniform flow field.

The circumferential variation in convergent-divergent ratio as a result of a circumferential variation in throat area thus produces a circumferentially non-uniform flow field downstream of the nozzle exit. This enhances mixing of the shear layer reducing the extent of turbulent flow. The interaction of the turbulence and the shock cell structure responsible for the shock cell noise is thus further reduced as the turbulence is reduced.

In cases where the circumferential variation of convergent-divergent ratio is achieved with a circumferentially constant throat area (i.e. circular throat and sinusoidal variation of exit area) the circumferential non-uniformity in flow would be reduced but the circumferential variation in shock strength would persist and this would still reduce shock cell noise.

By contrast to serrations, circumferential variation of convergent-divergent ratio avoids the performance degradation due to tabs inserted into flow with incidence as this increases the drag on the serration. Serrations and tabs also have increased surface area exposed to the flow and this increases drag. The length (perimeter) of the trailing edge of the nozzle is a minimum for a circular nozzle in a plane perpendicular to the engine axis. The application of serrations or tabs increases the length of the nozzle trailing edge and thus increases the base drag.

The mixing achieved by varying the throat area circumferentially with undulations is as a result of manipulating the shock waves rather than deflecting the flow. Manipulating the shock waves to change flow directions is a near lossless process unlike deflecting the flow.

Serrations necessarily add weight to the design. The circular planar nozzle exit permitted by this invention is the minimum weight design. Mechanical challenge of tab and associated stress concentration are avoided. However, serration tabs suppress shock cell noise by enhanced mixing of shear layer.

A number of alternative embodiments to the regular sinusoidal or other shaped undulations presented circumferentially about the nozzle can be provided in accordance with the invention. Thus, the undulations or bumps may be provided on an inner surface of the outer wall of a bypass nozzle as described above, or alternatively the bumps or undulations can be provided on the outer surface of an inner wall of the bypass nozzle or bump undulations provided on the inner surface of the outer wall of the core nozzle or bumps and undulations provided on the outer surface of the inner wall of the core nozzle or combinations of these configurations. In the specific embodiment described above, it will be appreciated that there is a circular nozzle exit with sinusoidal variation in available throat flow area, but alternatively there could be a circular throat area with variation in the exit area by corrugating the nozzle exit area edge to create undulating correlations. Furthermore, there may be variation in the available throat flow area and variation in the exit area in such a way that leads to undulations that enhance shear layer turbulence and mixing as described above for noise reduction. Additionally, although described with regular spacing of the sinusoidal bumps or undulations in the embodiment described above, it will also be understood that there may be a range of different bump or undulation distributions as described below in a number of alternative embodiments.

The particular combination of bump or undulation position in relation to distribution as well as exit plane area will depend upon particular engine design requirements.

FIG. 10 illustrates a first alternative embodiment of a nozzle in which bumps 140 are arranged with a regular distribution about an inner nozzle surface 141 of an outer wall of a bypass nozzle. The bumps have undisturbed regions 143 between them in which the nozzle therefore acts as a simple convergent nozzle in these parts with the bumps 140 providing the convergent-divergent variation in available flow throat area as required for noise suppression. It would be appreciated that an opposed surface (not shown) of the nozzle may include itself undulations or bumps which may directly oppose the bumps 140 or interleave with those bumps 140 such that these bumps in the opposed surface directly oppose the undisturbed regions 143.

FIG. 11 illustrates a second alternative embodiment of a nozzle. Thus, bumps 240 are arranged with irregular spacing in an inner nozzle surface 241 of an outer wall 242 of a bypass nozzle. By such irregular spacing of the bumps 240, it is possible that there is further disturbance with respect to circumferential modes for shear layer turbulence or there may be variation in the noise suppression level at certain directions of the nozzle in comparison with others dependent upon operational requirements.

FIG. 12 illustrates a third alternative embodiment of the present nozzle. Thus, bumps 340 are located in groups or individually in an inner nozzle surface 341. Thus in a similar fashion to that with regard to the second alternative embodiment depicted in FIG. 11, there is circumferential variation in the distribution of the bumps 340a compared to bumps 340b in order to again disturb the circumferential modes and vary the noise suppression level at different directions of the nozzle.

FIG. 13 illustrates a fourth alternative embodiment of the present nozzle in which undulations or bumps are provided at different axial positions as compared to circumferential conditions in previous embodiments. Thus, bumps 440 are provided in an inner nozzle surface 441 of an outer wall 442 of a bypass nozzle. It will be noted that undulations or bumps 440a are essentially based at an exit plane edge 443 of the nozzle, whilst bumps or undulations 440b are slightly displaced from that exit edge 443, whilst the undulations or bumps 440c are even further displaced from the edge 443. Such an arrangement will provide a variation in the convergent-divergent ratio over a broader axial length of the nozzle and therefore provide different operational performance compared to previous embodiments.

For each of the bumps 440a,b,c,d their first radius, which defines their upstream surface, are located at respectively 0%, 5%, 2.5% and 7.5% of the nozzle exit diameter, upstream of the nozzle throat. However, it should be appreciated that each of the bumps 440a,b,c,d are located and sized within the ranges defined hereinbefore.

Figure 13B:
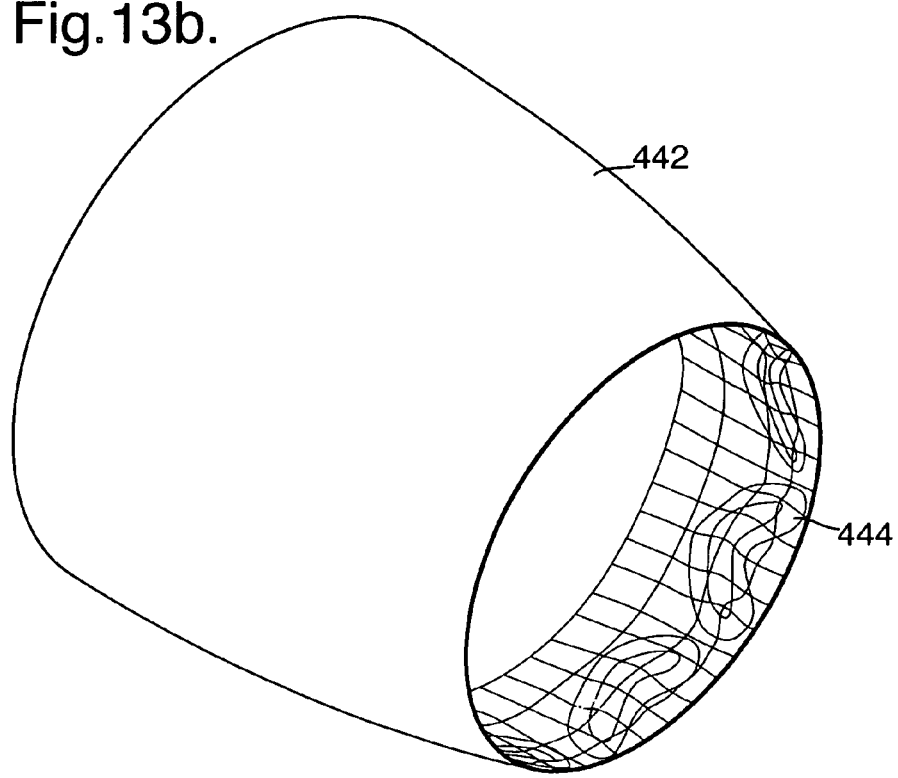

FIGS. 13a and 13b show alternative embodiments to that shown in FIG. 13, where a number of adjacent bumps (440a, b,c,d in FIG. 13) are merged circumferentially to form one or more larger and therefore more complex undulations 443, 444. For each of these embodiments the bumps 443, 444 are generally sinusoidal or part sinusoidal in a circumferential sense and comprise their first radii axially located between 0% and 7.5% of the nozzle exit diameter, upstream of the nozzle throat. The second and third cross-section radii are accordingly located relative to the first radius at any given axial cross-section through each bump 443, 444. In these embodiments the maximum amplitude is constant (i.e. it forms a ridge of maximum amplitude) except at the circumferential extents, where each bump blends out to the nozzle wall. It should be appreciated that in other embodiments the maximum amplitude may be varied circumferentially along the bumps 443, 444.

FIG. 14 illustrates a fifth alternative embodiment of the present nozzle in which bumps 540 are provided which have different amplitudes at different circumferential and axial locations in an inner nozzle surface 541 of an outer wall 542. In such circumstances, the different amplitudes for the bumps or undulations 540 may provide differing levels of noise reduction in different directions of the nozzle, and through changing the available flow area throat could improve mixing to allow further noise control. As can be seen, bump or undulations 540b have a greater amplitude than bumps or undulations 540a, 540c and have a greater axial length whilst undulations 540b, 540c respectively have different circumferential widths and axial lengths compared to each other and undulation 540a.

FIG. 15 illustrates a sixth alternative embodiment of a nozzle in which bumps or undulations 640 are presented in an inner nozzle surface 641 of an outer wall 642 of a bypass nozzle. Thus, the bumps or undulations 640 are grouped in regions with other undisturbed regions between them such that differing levels of noise suppression will be provided and therefore quieter areas achieved relative to normal nozzle operation. Such regionalisation of the bumps or undulations will provide a similar effect to a regular spacing and the bumps or undulations described with regard to the third alternative embodiment (FIG. 12) above.

FIG. 16 illustrates a seventh alternative embodiment of a nozzle. Thus, undulations or bumps 740 are presented in a serrated outer wall 742 of a bypass nozzle. The bumps or undulations 740 are again presented on an inner nozzle surface 741 of the wall 742. As described previously, the bumps or undulations could be provided in an inner or outer wall of a nozzle, but FIG. 16 only illustrates provision of the bumps or undulations 740 in the inner surface 741 of the outer wall 742. In such circumstances, the effects of serrations 743 are enhanced by this circumferential change in the convergent-divergent ratio created by the bumps and undulations 740. Such an arrangement may provide enhanced noise suppression, although as described previously, provision of serrations 743 may add to drag and other factors with respect to engine operation.

FIG. 17 provides a further eighth alternative embodiment of the present nozzle. Thus, as with the seventh alternative embodiment depicted in FIG. 16, bumps or undulations 840 are provided upon an inner nozzle surface 841 of an outer wall 842 of a bypass nozzle. In comparison with the embodiment depicted in FIG. 16, the bumps or undulations 840 circumferentially change the convergent-divergent, ratio, but do not extend into tab or serration portions 843, but are upon a fixed portion of the nozzle prior to such serrations 43. Again, such an approach will provide an alternative for particular operational requirements in terms of noise suppression and shear layer turbulence.

FIG. 18 illustrates a further ninth alternative embodiment of a nozzle. Thus, in comparison with the embodiment depicted in FIG. 17, bumps or undulations 940 are again provided in an inner nozzle surface 941 of an outer wall 942 of a bypass nozzle. However, the bumps or undulations 940 still remain prior to serrations 942 in the exit plane of the nozzle and in comparison with the embodiment depicted in FIG. 17, these bumps 940 are out of phase with the serrations 943 in order to provide a further enhancement or variation in noise suppression performance dependent upon operational requirements.

It will be understood that noise and therefore noise suppression requirements will vary dependent upon an engine's operational state. In such circumstances, bumps or undulations in accordance with the present invention may be variable dependent upon operational conditions or desired requirements. In such circumstances, the bumps or undulations may have a shaped memory alloy type function and therefore vary according to temperature or other requirements in terms of amplitude and shape for variation in the turbulence created in the shear layer for noise suppression. Where possible, the bumps or undulations may be arranged to be electively deployable through use of inflation or deflectable mechanical panels or otherwise in order to change their amplitude, both in terms of inward deflection as well as axial length and circumferential spacing for operational requirements.

FIG. 19 provides a schematic illustration of an engine nozzle arrangement in which the respective nozzle surfaces are illustrated. Thus, a bypass nozzle is provided by an outer wall 1002 and an inner wall 1003 such that surfaces 1001 and 1004 may incorporate bumps or undulations in accordance with the present invention in order to vary the convergent and divergent ratio across the nozzle surfaces 1001, 1004 in accordance with the present invention. Similarly, an outer wall 1005 and an inner wall 1006 present opposing surfaces 1007, 1008 of a core nozzle. These nozzle surfaces 1007, 1008 may also incorporate undulations or bumps in accordance with the present invention in order to vary the convergent-divergent ratio across the core nozzle. In such circumstances, additional noise suppression may be provided by creating turbulence in the shear layer between jets for noise suppression as described above.

It will be understood that undulations particularly in a core nozzle will be subject to erosion at high temperatures, thus provision may be made for replacement of undulations as securable elements or assembly to a nozzle surface.

Alternative embodiments and modifications of the present invention will be understood by those skilled in the art. Thus, for example, rather than providing smooth splines for undulations or bumps as described above, more angular bumps or undulations may be provided. For example, a triangular cross-section bump, defining an apex at its point of maximum amplitude, may be used. Furthermore, there may be axial cycling in the bump or undulation amplitude axially or circumferentially if required in order to create mini turbulence in the jet flow for noise suppression.

In FIG. 20, the nozzle 42 comprises an arrangement of deployable noise reducing tabs 80, 82 which are described in U.S. Pat. No. 6,813,877, the teachings of which are incorporated herein. Briefly, circumferentially alternate tabs 80 are rigidly fixed in a 'deployed' position as shown in the figure, where they interact with the gas streams to enhance mixing out the noise creating shear layer between gas streams. The deployable tabs 82 comprise shape memory material and are moveable between a deployed position as shown in FIG. 20 and a non-deployed position, where they are aligned and abutting tabs 80. During take-off and climb the tabs 82 are deployed, angled radially outwardly, for noise reduction purposes and the exit area of the nozzle 12 is enlarged. This enlargement reduces the velocity of the gas stream issuing from the bypass duct 12 and which intrinsically reduces exhaust noise. At aircraft cruise the tabs 82 are in the non-deployed position, where adjacent tabs' edges 88, 90 are in sealing engagement with one another, and the exit area is therefore reduced. This reduction increases the velocity of the exhaust gas stream and improves engine efficiency.

As the bumps 40 are designed primarily for reducing aircraft cabin noise at cruise, the exhaust exit plane 36 in this case is defined by a downstream edge 86 of the tabs 80, 82 when in their non-deployed position. The bumps 40 are still positioned within the range of positions specified hereinbefore and may therefore be situated on one or more of the tabs' radially inner surface, depending on the axial length of the tab and the convergent-divergent ratio.

FIG. 21 show a bump 40 situated on each of the tabs 80, 82 around the nozzle 42 circumference. The shape and configuration of the bumps 40 are as hereinbefore described.

In further embodiments of the present invention shown in FIGS. 22, 22A and 23, the bumps 40 are deployable and preferably comprise shape memory material as a means for actuating the bumps between a deployed position 40' and a non-deployed position 40". Shape memory material (SMM) is well known in the industry and is not discussed further except that its operation is similar to that for the deployable nozzle tabs as disclosed by the present applicant in U.S. Pat. No. 6,813,877, the teachings of the use of shape memory material are incorporated herein. The main advantage of having deployable bumps is to reduce aerodynamic drag when they are not required.

In the non-deployed position 40" the gas stream through the nozzle 42 is not disturbed by any bump 40 as would otherwise be the case and described hereinbefore. In the deployed position 40', particularly used at aircraft cruise, the bumps 40 interact with the gas stream and reduce exhaust noise as herein described.

In each figure the bumps 40 are formed from a shape memory material element 60 which is prestressed to a particular shape and changes shape, at a predetermined temperature, between the deployed and non-deployed positions. In FIG. 22 securing means 61 attaches a continuous ring of SMM defining bump elements 60. However, individual SMM elements may equally be used and attached to the nozzle wall by the securing means 61. The securing means 61 may be a nut and bolt, weld, screw or other capturing member. The dashed lines define the non-deployed position 40" of the SMM element 60. In the left hand part of the figure, the nozzle wall 42 defines a bump 62 having amplitude between the maximum amplitude 38 and the otherwise 'original' nozzle wall profile indicated by the dashed line 63. This arrangement is advantageous in that there are two bump amplitudes which are help to attenuate cabin noise at two different engine operating points.

In FIG. 22A shows a further embodiment of the SMM element 60, where there are two layers of SMM material 64, 65 which have different switch temperatures. At a first temperature element 64 switches and the bump obtains a first shape 40''' and at a second temperature element 65 obtains a second shape, the second shape having a greater amplitude that the first shape.

In an alternative embodiment of FIG. 22A, the layer 64 is a spring element, which comprises titanium or other suitable resilient material, such that the spring element provides a force to retain or return the bump in the non-deployed position or perhaps in the deployed position. The element 60 is arranged such that the change in modulus of the SMM element 65 is capable of bending the element 60 into the desired shape.

In the embodiments shown all the downstream surfaces of the bumps blend out at or just upstream of the final exit plane 36. Thus the exit plane itself is a smooth and in these cases circular shape. However, it is possible that the downstream surface is intersected by the nozzle exit plane particularly where the convergent-divergent is 1.00 or very close thereto.

We claim:

1. A nozzle for a gas turbine engine, the nozzle comprising a nozzle surface defining a plurality of undulations to vary in a circumferential direction, perpendicular to a jet flow direction, an available cross sectional area across the nozzle between the nozzle surface and an opposed surface of the nozzle over a desired convergent-divergent ratio range for noise control of the jet passing through the nozzle in use, wherein the undulations have amplitude in the range 0.1-2.0% of the nozzle exit diameter to attenuate shock cell noise.

2. A nozzle as claimed in claim 1, the undulations also providing variation in an angle of flow of the jet passing through the nozzle.

3. A nozzle as claimed in claim 1 wherein the variation in cross sectional area is adjusted to provide stimulation in mixing of a shear layer of the jet for relative noise reduction in comparison with that without mixing of the shear layer of the jet.

4. A nozzle as claimed in claim 1 wherein the undulations alter a repeat cycle or provide variation of intensity of shock cells generated by the jet.

5. A nozzle as claimed in claim 1 wherein the undulations comprise bumps formed in the nozzle surface.

6. A nozzle as claimed in claim 1 wherein the undulations are sinusoidal in the circumferential direction.

7. A nozzle as claimed in claim 1 wherein the undulations each comprise maximum amplitude, the maximum amplitude situated a distance between 2% and 15% of the nozzle diameter along the nozzle surface upstream from the nozzle exit plane.

8. A nozzle as claimed in claim 7 wherein the maximum amplitude situated a distance equivalent to 6% of the nozzle diameter upstream of nozzle exit plane.

9. A nozzle as claimed in claim 1 wherein the undulations each comprise a maximum amplitude, the maximum amplitude situated within a distance equivalent to +/−2% of the nozzle diameter along the nozzle surface from the nozzle throat plane.

10. A nozzle as claimed in claim 1 wherein an approximate cross-section shape of the undulations are from a group comprising triangular, trapezoidal, part-circular, and asymmetric-sinusoidal.

11. A nozzle as claimed in claim 1 wherein the undulations have an aerodynamically smooth gradual spline in an axial direction of jet flow in use.

12. A nozzle as claimed in claim 11 wherein the aerodynamically smooth spline is between radii at three fixed axial locations along the nozzle surface from the nozzle exit plane, one radii within a distance upstream equivalent to 20% of the nozzle diameter, one radii at a point of maximum undulation amplitude within an upstream distance equivalent to 15% of the nozzle diameter and one radii within 10% of the nozzle exit plane diameter.

13. A nozzle as claimed in claim 1 wherein the convergent-divergent ratio is in the range of 1 to 1.01.

14. A nozzle as claimed in claim 1 wherein the nozzle comprises a bypass nozzle of a gas turbine engine with the undulations on an inner surface of an outer wall or outer surface of an inner wall of the bypass nozzle.

15. A nozzle as claimed in claim 1 wherein the nozzle is a core nozzle of a gas turbine engine with undulations on an inner surface of an outer wall or outer surface of an inner wall of a cone nozzle.

16. A nozzle as claimed in claim 1 wherein the undulations are symmetrically regularly circumferentially distributed about the nozzle surface.

17. A nozzle as claimed in claim 1 wherein the undulations are asymmetrically or irregularly circumferentially distributed about the nozzle surface.

18. A nozzle as claimed in claim 1 wherein the undulations are at different axial positions relative to an exit plane of the nozzle.

19. A nozzle as claimed in claim 1 wherein the undulations have groups of differing amplitudes circumferentially or axially in the nozzle surface.

20. A nozzle as claimed in claim 16 wherein the undulations may have different groups of axial length or width relative to each other.

21. A nozzle as claimed in claim 1 wherein the nozzle surface has an edge with serrations or tabs.

22. A nozzle as claimed in claim 21 wherein the undulations are arranged reciprocally with the serrations for additional variation in convergent-divergent ratio range.

23. A nozzle as claimed in claim 21 wherein the tabs are deployable for noise reduction.

24. A nozzle as claimed in claim 21 wherein alternate tabs are deployable for noise reduction.

25. A nozzle as claimed in claim 23 wherein undulations are formed on one or more of the tabs.

26. A nozzle as claimed in claim 1 wherein the undulations are transformable between a deployed position and a non-deployed position, the non-deployed position being less aerodynamically obtrusive than the deployed position.

27. A nozzle as claimed in claim 26 wherein the undulations are transformable to a second deployed position, between the deployed and non-deployed positions.

28. A nozzle as claimed in claim 26 wherein the undulations comprise a shape memory material element.

29. A nozzle as claimed in claim 28 wherein the shape memory material element comprises two layers of shape memory material, each layer having different switch temperatures and capable of deploying in a first shape and a second shape, the second shape having a greater amplitude that the first shape.

30. A nozzle as claimed in claim 28 wherein the shape memory material element comprises two layers, one layer of shape memory material and the other layer of resilient material to provide a spring force to the element.

31. A nozzle as claimed in claim 1 wherein the undulations are integral with the nozzle.

32. A nozzle as claimed in claim 1 wherein the undulations are created by attached elements individually or as part of an assembly secured to the nozzle surface.

33. A nozzle as claimed in claim 1 wherein the undulations are variable in terms of amplitude or position or distribution in the nozzle surface.

34. A nozzle as claimed in claim 26 wherein such variation is by use of inflatable features with the nozzle surface or deployable mechanical portions of the nozzle surface.

35. A nozzle as claimed in claim 1 wherein the number of undulations is in the range of one to forty two undulations distributed about the nozzle surface.

36. A gas turbine engine incorporating a nozzle as claimed in claim 1.

37. A nozzle as claimed in claim 1 wherein the convergent-divergent ratio is 1.008.

38. A nozzle as claimed in claim 1 wherein the number of undulations distributed about the nozzle surface is twenty.

* * * * *